May 31, 1966  I. B. MARGILOFF  3,253,553
CONVEYORS
Filed May 7, 1964  3 Sheets-Sheet 1
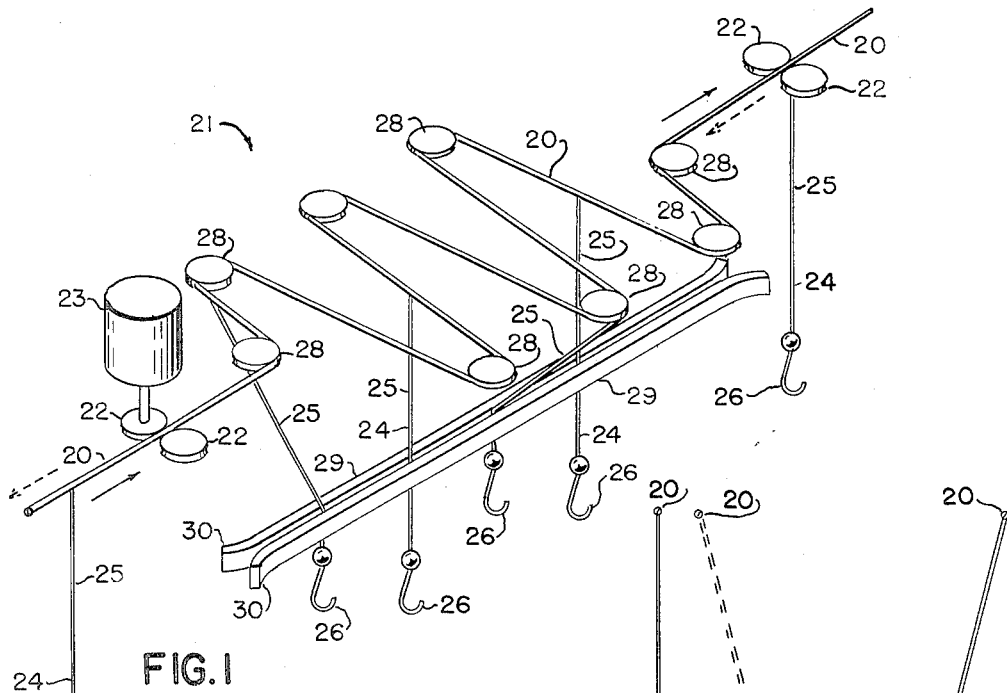
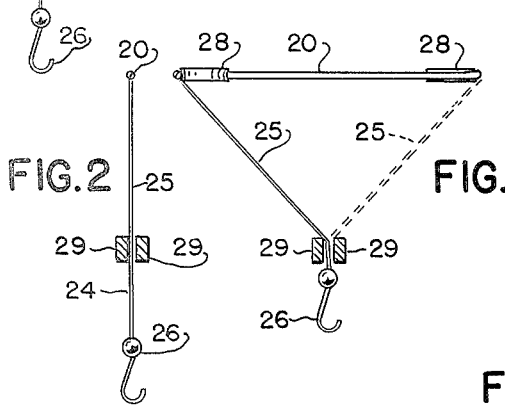
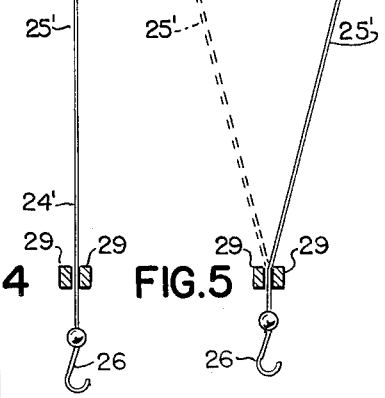
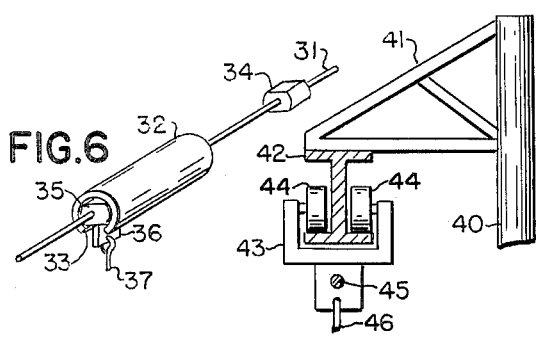
INVENTOR:
IRWIN B. MARGILOFF
BY
William A. Drucker
ATTORNEY May 31, 1966  I. B. MARGILOFF  3,253,553
CONVEYORS
Filed May 7, 1964  3 Sheets-Sheet 2
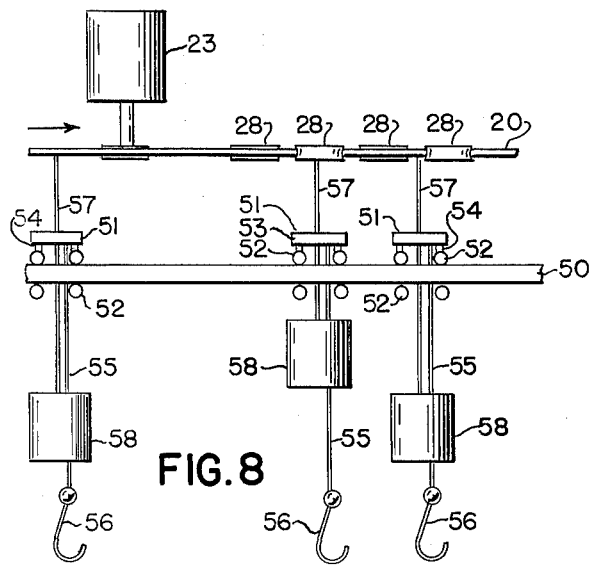
FIG. 8
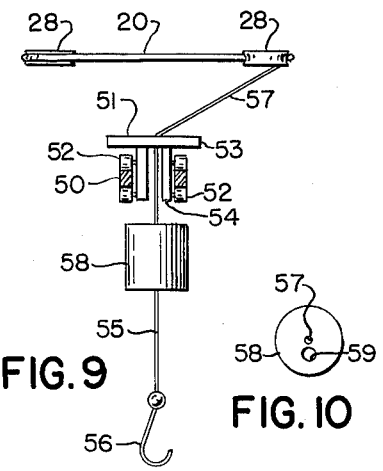
FIG. 9
FIG. 10
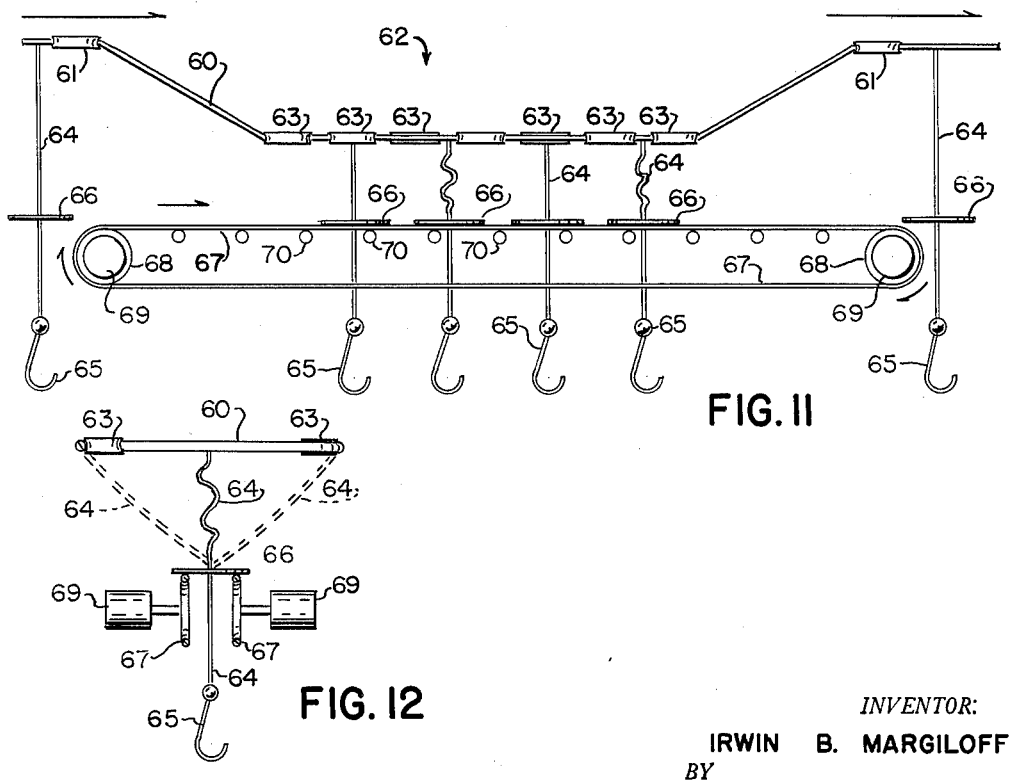
FIG. 11
FIG. 12
*INVENTOR:*
IRWIN B. MARGILOFF
BY
ATTORNEY May 31, 1966     I. B. MARGILOFF     3,253,553
CONVEYORS
Filed May 7, 1964     3 Sheets-Sheet 3
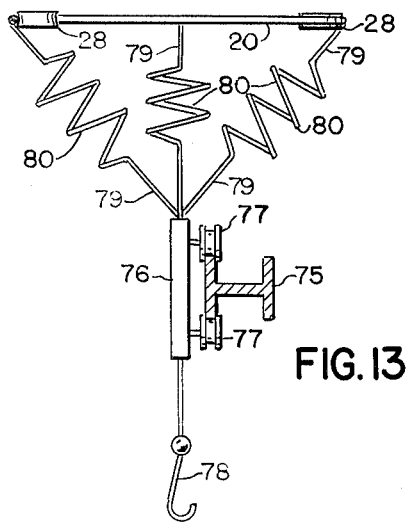
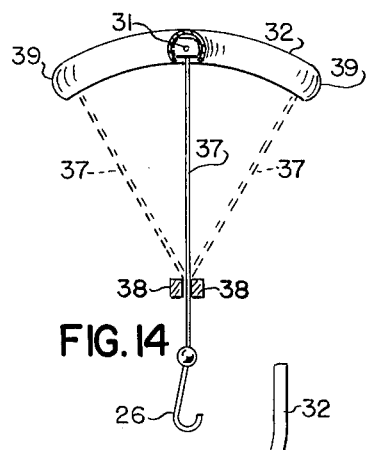
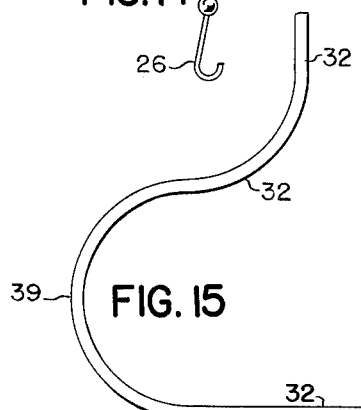
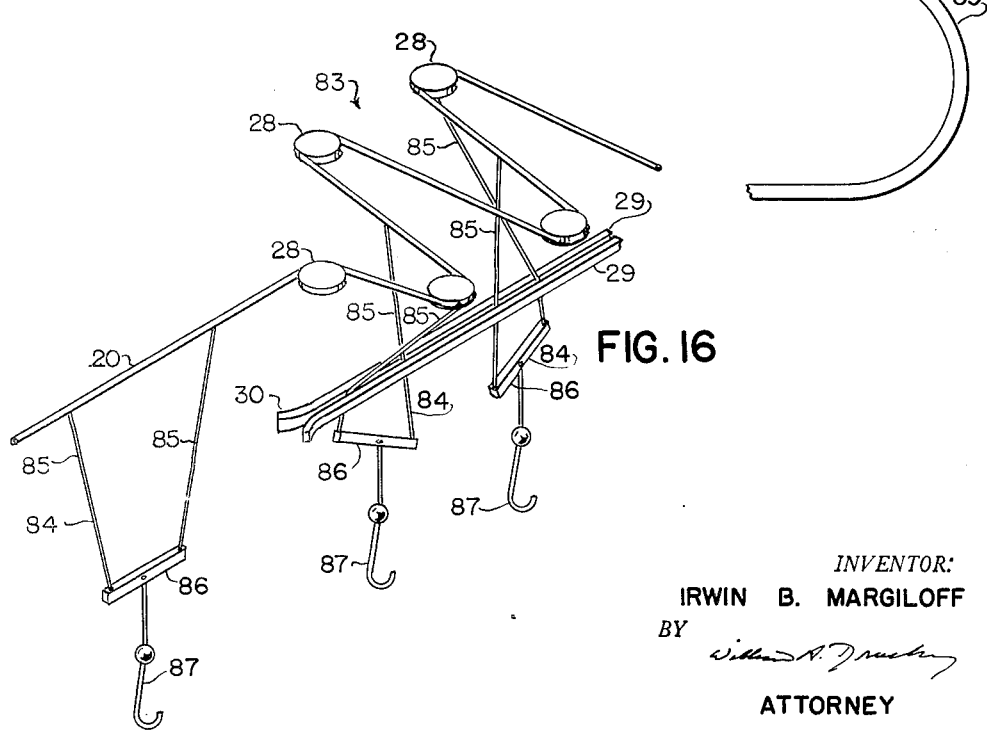
*INVENTOR:*
IRWIN B. MARGILOFF
BY
ATTORNEY

United States Patent Office 3,253,553
Patented May 31, 1966

3,253,553
CONVEYORS
Irwin B. Margiloff, 201 E. 19th St., New York, N.Y.
Filed May 7, 1964, Ser. No. 365,728
15 Claims. (Cl. 104—180)

This invention relates in general to conveyor systems and, more particularly, to conveyor systems having separate units which move at varying rates of speed about a closed path.

In conveyor systems in common use, such as ski lifts, material handling equipment in factories, and the like, the individual load carrying units need not come to a complete stop to allow for their loading and unloading. The loading and unloading may be accomplished while the units move very slowly past or through a loading station. The units should then be accelerated to higher rates of speed between terminal points so that goods or passengers may be rapidly transported.

The basic principle of my invention has been set forth in my U.S. Patent No. 3,119,348. The instant invention provides a conveyor system in which a load may be suspended from an overhead cable or track. It is to be understood, however, that the drive means of this invention may also be used to draw a vehicle over a floor or along a track.

It is, therefore, an object of this invention to provide a more inexpensive and simple conveyor system having terminal points and means to drive conveyor units slowly past the terminal points and then more rapidly between them.

Another object of this invention is to provide an apparatus which renders continually available transportation past terminal points at a low speed and between terminal points at a relatively high speed and which has load supporting units suspended from and carried along by an overhead cable driven at a constant speed.

A further object of this invention is to provide a simpler and more efficient conveyor system having load carrying units driven by an overhead moving cable.

Still another object of this invention is to provide a drive for a conveyor system having terminal points and load carrying units which pass rapidly between terminal points and more slowly past them.

Many other objects, advantages, and features of invention reside in the construction, arrangement and combination of parts involved in the embodiments of my invention and its practice as will be understood from the following description and accompanying drawing wherein:

FIGURE 1 is a perspective view of a first embodiment of this invention showing a fragment of an overhead drive cable passing in a serpentine path about pulleys disposed over a loading station with load support units depending from the drive cable and being confined between guide rails in the loading station;

FIGURE 2 is a transverse vertical section taken across the apparatus of FIGURE 1 showing a load support unit as it enters between a pair of loading station guide rails;

FIGURE 3 is a transverse vertical section through the loading station of the apparatus of FIGURE 1 showing the upper end of a load support unit passing about a pulley with the drive cable, the lateral displacement of the upper end of the load support unit drawing the load support unit upward between the pair of loading station guide rails, lateral displacement of the upper end of the load support unit in another direction being shown in dotted lines;

FIGURES 4 and 5 are transverse vertical sections through an apparatus similar to that shown in FIGURE 1 showing a longer load support unit extending downward a greater distance from the drive cable to pass between a pair of loading station guide rails; FIGURE 5 showing the lateral displacement of the upper end of the load support unit in another direction in dotted lines;

FIGURE 6 is a perspective view of a fragment of an overhead tubular guide track through which a fragment of a drive cable passes, the drive cable having fixed thereto a positioning block and a support unit;

FIGURE 7 is a transverse vertical section through an overhead track showing a support therefor and showing a slidably or rollably mounted drive cable support fixed thereon;

FIGURE 8 is a side view of a second embodiment of this invention showing a fragment of a drive cable entering a loading station with load support units rolling along tracks disposed below the drive cable;

FIGURE 9 is a transverse vertical section through the tracks of the apparatus of FIGURE 8 showing an end view of the connection of the drive cable to a load support unit as the load support unit passes through a loading station;

FIGURE 10 is a top view of a weight which may be used in the second embodiment of my invention;

FIGURE 11 is a side view of the third embodiment of my invention showing load support units being independently supported and slowly moved through a loading station;

FIGURE 12 is a transverse vertical section through the apparatus of FIGURE 11 showing a load support unit passing through a loading station with the extreme lateral displacements of the upper end of a load support unit being shown in dotted lines;

FIGURE 13 is a transverse vertical section through a fourth embodiment of this invention showing load support units passing through a loading station;

FIGURE 14 is a transverse vertical section through a further modification of the first embodiment of this invention showing a load support unit entering a loading station and passing between loading station guide rails, extreme lateral displacements of the upper end of a load support unit being shown in dotted lines, this modification of the first embodiment of this invention being shown using the tubular track of FIGURE 6;

FIGURE 15 is a top view of a fragment of the tubular guide track of FIGURE 14 as it might appear entering a loading station; and FIGURE 16 is a perspective view of a fragment of a drive cable entering a loading station according to a fifth embodiment of this invention.

Referring to the drawing in detail, the first embodiment of this invention, as shown in FIGURES 1-3, is extremely easy and simple to construct. A drive and support cable 20 is the means by which a payload is moved between two or more stations. At given locations along the cable there are disposed loading stations, one of which is generally designated by the numeral 21 in FIGURE 1.

Drive cable 20 may pass in an endless loop, or it may alternately be wound back and forth from one drum to another (not shown).

Between loading stations, the cable 20 is supported by pairs of pulleys 22 which have cut out rim portions to engage the cable 20. One or more of the pairs of pulleys 22 may be driven by one or more motors 23 to move the endless cable 20 or the cable being wound between drums at a constant speed. Hanging from the drive cable 20 are a number of load support units 24. In their simplest form, the load support units 24 consist of a limber upper cable 25 and a lower load supporting and transporting hook 26.

At each loading station 21, the drive cable 20 describes a serpentine path about the pulleys 28. Below the guide cable 20 in the loading station 21 there extends a pair of parallel and closely spaced loading station guide rails 29. The ends 30 of the loading station guide rails 29 may diverge to facilitate the entry of the limber cables 25 between them.

The first embodiment of my invention may operate in the following manner. If the drive and support cable 20 is moved wtih a linear velocity of 9 feet per second, useful loads supported by the hooks 26 will move at nine feet per second between the loading and unloading stations 21. If a loading station 21 were ten feet long and the length of cable 20 describing a serpentine path through the loading station were 30 feet, the average forward component of velocity of the cable 20 and the load support units 24 in the loading station 21 would be 3 feet per second. This slower forward velocity, in the case of ski lifts or tows, apparatus for moving light manufactured goods, and like devices, will allow the ready loading and unloading of people or articles being transported.

As may be further seen in FIGURES 1–3, as the drive cable 20 describes a serpentine path through the loading station 21, it carries the upper ends of the limber cables 25 from side to side. As the upper ends of the cables 25 move laterally, the cables 25 are drawn upward to some extent between the pair of loading station guide rails 29. Thus, as the load support units 24 move through a loading station, their hooks 26 undulate up and down.

However, as shown in FIGURES 4 and 5, if the loading station guide rails 29 are disposed a greater distance below a drive cable 20, load support units 24' having longer limber or flexible cables 25' may be provided to minimize the vertical motion or undulations of the hooks 26. For most practical applications, such as use in ski lifts and the like, the guide rails 29 should be disposed below the drive cable a distance at least equal to the width of the lateral meanders of the cable 20 in a loading station. Thus, if the guide rails 29 are disposed four feet below a drive and support cable 20 which meanders a total distance of four feet from one side to the other, the vertical motion of the hooks 26 depending therefrom will be approximately six inches.

As shown in FIGURE 6, a guide cable 31 may pass through a tubular guide track 32. Guide track 32 may be cylindrical with a cut out slot 33 in its lower portion. Guide blocks 34 may be spaced along the cable 31 at short intervals to guide it within the track 32. Support blocks 35 have a member 36 depending from them through the slot 33. A support cable 37 is fixed to each member 36 to carry a load to be transported. Thus, as shown in FIG. 15, a tubular guide track 32 may extend with a straight run between loading stations. In loading stations, the track 32 describes a serpentine path to reduce the average forward component of velocity of the cable 31. Guide rails (not shown), similar to those shown in FIGURE 1, may be provided to constrain lateral motion of the lower ends of the support cables 37. The blocks 34 and 35 may be made of a material which slides easily in the track 32 or they may be designed to have projecting rollers which ride within track 32. Any suitable drive means may be provided to move the cable 31 within the track 32.

As shown in FIGURE 14, within a loading station, guide rails 38 extend below the tubular guide track 32. The limber or flexible support cables 37 extend between the guide rails 38 in the same manner as has been described. However, if the laterally disposed edges 39 of the convolutions of the track 32 within a loading station are curved downward, the entire serpentine path of a track 32 within a loading station may be disposed at the same distance from the guide rails 38. Thus, in this modification of the first embodiment of my invention, vertical motion of the hooks 26 may be minimized or substantially eliminated.

Referring now to FIGURE 7, a number of stanchions 40 support a track 42 by means of the brackets 41. A number of drive cable supports 43 are slidably or rollably mounted on track 42 by means of rollers 44. A drive cable 45 has the drive cable supports fixed along its length at close intervals. Thus the track 42 may described a serpentine path at loading stations and the drive cable supports will guide the cable 45 about the serpentine path below the track 42. When desired, a limber support cable 46 may be fixed to a drive cable support 43 to carry a useful load in the manner which has been described.

While FIGURE 1 shows a generally zigzag path of the drive cable in a loading station and FIGURE 15 shows an S-shaped path of the track 32 in a loading station, any desired configuration may be used. Momentary rapid forward motion of the upper ends of the limber cables 25 as they pass about the pulleys 28 will not be fully transmitted to the hooks 26 because the cables 25 exert a shock absorbing effect. The hooks 26 maintain a smooth and steady slow forward motion through the loading stations. Other configurations of a drive cable 20 through a loading station will also have irregular forward components of velocity absorbed by the swinging of the limber cable 25 in the same manner. While completely limber upper cables 25 are shown, portions of the cables 25 may be made stiff or rigid if desired.

As shown in FIGURES 8 and 9, a second embodiment of my invention has a drive cable 20 driven by a motor 23 in the same manner as was described for the first embodiment of this invention. At loading stations cable 20 describes a serpentine path about the pulleys 28. Between loading stations, the cable 20 has relatively straight runs. Disposed below cable 20 are a pair of tracks 50 on which the rollably mounted support elements are held by means of the rollers 52. The support elements 51 have an upper platform 53 from which two pairs of downward projections 54 extend. The rollers 52 are rotatably fixed to the downward projections 54. Depending cables 55 hang downward from the upper platforms 53 between the tracks 50 and have the hooks 56 fixed to their lower ends to secure payloads.

Limber connecting cables 57 are fixed at points along the length of drive cable 20. The connecting cables 57 each extend through a central aperture in an upper platform 53 and hang downward beside the cables 55. A weight 58 hangs at the end of each connecting cable 57 and contains a large aperture 59, as shown in FIGURE 10, through which a depending line 55 may extend.

The second embodiment of this invention operates in the following manner. Between loading stations, drive cable 20 urges a support element 51 along the tracks 50 at a speed equal to that of the drive cable 50. When a loading station is reached, drive cable 20 describes a serpentine path and the connecting cables 57 move alternately from side to side as shown in FIGURE 9. When the upper ends of the connecting cables 57 move laterally, they draw the weights 58 upward along the cables 55. Since the average forward component of velocity of drive cable 20 at a loading station is considerably reduced, the support elements 51 move more slowly through the loading stations than between them. Any irregular accelerations experienced by the support elements 51 will be mitigated and dampened out by the shock absorbing action of the rising and falling weights 58.

As shown in FIGURES 11 and 12, the third embodiment of this invention has a drive and support cable 60 which passes between pairs of pulleys 61 in relatively straight runs between loading stations. Any suitable means (not shown) may be provided to drive the drive cable 60. In each loading station, generally designated by the numeral 62, the drive cable 60 dips downward to describe a serpentine path about the pulleys 63. At regular intervals along the length of drive and support cable 60 there are fixed limber support unit cables 64 which have load carrying hooks 65 at their bottom ends. Disposed on and fixed at an intermediate position on the support unit cables 64 are disks or other flat horizontally placed support members 66.

Disposed along the length of each loading station below the serpentine path of support cable 20 are two endless belts 67 disposed about the pulleys 68 which are driven at a desired lower loading station velocity by the sets of motors 69. Thus, as shown in FIGURES 11 and 12, in each loading station the support members 66 are dropped on the endless belts 67 to be slowly carried across the loading station. Support rollers 70 may be provided if needed to support the upper run of the endless belts 67. The portions of the support unit cables 64 above the support members 66 remain slack as the belts 67 carry the support unit cables through the loading station. As the support unit cables pass to the end of the loading station, the drive cable 60 passes upward relative to the belts 67 to lift the support members 66 clear of the belts 67. The support unit cables 64 and the hooks 65 then move away at a higher velocity between loading stations.

If it is not desired to have the drive and support cable 60 dip down over the endless belts 67, the drive cable 60 may be disposed in a horizontal plane and the endless belts 67 may rise up beneath it in the loading stations to lift the support members 66 and carry them along.

Referring now to FIGURE 13, a fourth embodiment of my invention has a drive cable 20 substantially identical to that shown in FIGURE 1. In loading stations, the drive cable 20 describes a serpentine path about the pulleys 28 so that it has a lower average forward component of velocity. Any suitable type of track 75 is mounted to extend below the drive cable 20 and have the support units 76 rollably mounted on it by means of the rollers 77. Suitable hooks 78 or other load carrying means may be fixed to the support units 76. Each support unit 76 is connected to drive cable 20 by means of a connecting cable 79 which contains a central spring portion 80. Therefore, as shown in FIGURE 13, as the upper ends of the connecting cables 79 move from side to side following a serpentine path, the tension springs 80 distend, accordingly allowing the support units 76 to move smoothly at a desired lower velocity through the loading stations.

FIGURE 16 shows the fifth embodiment of my invention. A drive cable 20, substantially identical to that shown in FIGURE 1, extends between loading stations, one of which is generally designated by the numeral 83. In the loading stations 83, the drive cable 20 describes a serpentine path about the pulleys 28. Support units 84 each consist of two limber or flexible cables 85 which extend downward from cable 20 to have their lower ends fixed to the ends of a horizontal bar 86. A hook 87, or other load fastening device, is pivotally or otherwise fixed to hang or depend from the center of each bar 86. A pair of guide rails 29, similar to those shown in FIGURE 1, extend along each loading station.

The fifth embodiment of this invention operates in the following manner. The upper ends of the cables 85 of each unit 84 are fixed to the drive cable 20 a distance apart equal to one half the length of each run of the serpentine or zigzag path of cable 20 in a loading station. Thus, when passing through a loading station, as one cable 85 is extending downward its maximum distance, the other cable 85 has its upper end moved to the side and is pulled upward between the guide rails 29. Since the hooks 87 are fixed to the center of the bars 86, they move relatively smoothly through the loading stations with minimal vertical motions or undulations.

Further, since at least one or both of the flexible cables 85 will be pulled upward to some extent as they pass through a loading station, the hooks 87 tend to ride slightly higher as they pass through a loading station. This elevation of the hooks 87 within a loading station may be compensated to some extent if the upper ends of the cables 85 of each unit 84 are fixed to drive cable 20 a greater distance apart than the length of the bar 86. Since the forward displacement of the upper ends of the flexible cables 85 diminishes as they pass about the serpentine runs of cable 20 in a loading station, the bars 86 will tend to be lowered within the loading stations. The greater the distance apart the upper ends of the cables 85 are fixed, the greater will be the compensation tending to lower or compensate for the elevation of the bars 86 during their passage through a loading station.

While the fifth embodiment of this invention has been described as having the upper ends of the cables 85 fixed to a cable 20 a distance apart equal to one half the length of a run of cable 20 in a loading station, the upper ends of the cables 85 could be fixed a distance apart equal to one and one half, two and one half, three and one half, etc. times the length of a run in a loading station. These multiples of the length of a run in a loading station will ensure that one cable 85 of each unit 84 is extended its full length while the other cable 85 is pulled up between the rails 29.

The fifth embodiment of my invention may also be made using a guide track 32, similar to that shown in FIGURE 6. In a loading station, the guide track 32 would describe a serpentine or zigzag path. The upper ends of the cables 85 would be fixed to members 36 spaced a suitable distance apart along a cable 31.

While I have disclosed my invention in the best forms known to me, it will nevertheless be understood that these are purely exemplary and that modifications in the construction, arrangement and combination of parts and the substitution of equivalents, mechanically and otherwise, may be made without departing from the spirit of the invention except as it may be more limited in the appended claims wherein I claim:

1. In a conveyor system having at least one loading station along the conveyor system; a driven moving cable, support units suspended from said cable at intervals, said support units each having an upper member fixed to hang from said cable and having payload supporting means at the lower end of said upper member, means laterally diverting and supporting said cable in said loading station, means supporting said cable in relatively straight runs beyond said loading station, and guide means below said cable in said loading station constraining the lower portion of said upper member of each of said support units from lateral motion.

2. In a conveyor system having at least one loading station along the conveyor system; a driven moving cable, support units suspended from said cable at intervals, said support units each having a limber upper member fixed to hang from said cable and having payload supporting means at the lower end of said upper member, means laterally diverting and supporting said cable in said loading station, means supporting said cable in relatively straight runs beyond said loading station, and a pair of parallel guide rails disposed below said cable in said loading station, the lower portion of said limber upper members passing between said guide rails to be constrained from lateral motion.

3. The combination according to claim 2 wherein said means laterally diverting and supporting said cable in said loading station diverts said cable laterally a given distance and wherein said guide rails are disposed at least the given distance below said cable.

4. The combination according to claim 2 wherein said means supporting said cable in relatively straight runs comprises pairs of pulleys engaging the sides of said cable, and wherein said means laterally diverting and supporting said cable in said loading station comprises pulleys about which said cable passes in a serpentine path in said loading station.

5. The combination according to claim 2 wherein said means supporting said cable in relatively straight runs and said means laterally diverting and supporting said cable in said loading station comprises a track which guides and supports said cable.

6. The combination according to claim 5 wherein said track guides said cable laterally in said loading station at a constant distance from said guide rails.

7. The combination according to claim 2 wherein said guide rails have diverging ends facilitating the entrance of said upper members between said rails.

8. A conveyor system comprising a driven cable, support units suspended from said cable at intervals, said support units each having an upper member fixed to hang from said cable and having payload supporting means at the lower end of said member, a loading station in which said cable is laterally diverted, and guide means below said cable in said loading station constraining the lower portion of said upper member of each of said support units from lateral motion.

9. The combination according to claim 8 with the addition of support members fixed to said support units, and wherein said guide means below said cable in said loading station comprises a pair of endless belts which approach said cable in said loading station supporting said support unit by means of said support members, and means slowly driving said endless belts moving said support units through said loading station, the upper portion of each upper member remaining slack as said driven cable is laterally diverted in said loading station.

10. A conveyor system comprising a driven cable; support units suspended from said cable at intervals, said support units each having a pair of limber upper members fixed to hang from said cable, a horizontal bar having its ends supported by the pair of limber upper members, and payload supporting means suspended from the center of said bar; means laterally diverting said cable in runs of equal length forming a loading station; and a pair of parallel guide rails disposed below said cable in said loading station, the lower portions of said limber upper members passing between said guide rails to be constrained from lateral motion, each pair of upper members being fixed to said cable a distance apart equal to the length of a run of said cable in said loading station multiplied by a factor of an odd number divided by two.

11. The combination according to claim 10 wherein the upper members of each support unit are fixed to said driven cable a distance apart greater than the length of said bars.

12. A conveyor system comprising a driven cable, drive units fixed to said cable at intervals, said drive units each having an end fixed to said cable and having a payload moving end, a loading station in which said cable is laterally diverted, and guide means constraining at least a portion of said drive units from lateral motion in said loading station.

13. A conveyor system comprising a driven cable, a track disposed below said cable, support units slidably mounted on said track, said support units each having a connecting member fixed to said driven cable, at least one loading station in which said driven cable is laterally diverted, and means associated with said support units maintaining a resilient tension in said connecting members.

14. The combination according to claim 12 wherein said means maintaining a resilient tension in said connecting members comprises a tension spring in each of said connecting members.

15. The combination according to claim 12 wherein said support units each contain a vertical aperture, said connecting members are limber cables, and said means maintaining a resilient tension in said connecting members comprises a weight disposed at the end of each of said connecting members, said limber connecting members extending through the apertures in said support units suspending said weights below said support units.

No references cited.

ARTHUR L. LA POINT, *Primary Examiner.*

F. W. MONAGHAN, *Assistant Examiner.*